(12) United States Patent
Herron et al.

(10) Patent No.: US 6,844,729 B2
(45) Date of Patent: Jan. 18, 2005

(54) METHOD OF USING NUCLEAR SPECTROSCOPY MEASUREMENTS ACQUIRED WHILE DRILLING

(75) Inventors: Michael M. Herron, Ridgefield, CT (US); Susan L. Herron, Ridgefield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/453,263

(22) Filed: Jun. 3, 2003

(65) Prior Publication Data

US 2003/0205082 A1 Nov. 6, 2003

Related U.S. Application Data

(63) Continuation-in-part of application No. 09/975,416, filed on Oct. 11, 2001, now Pat. No. 6,571,619.

(51) Int. Cl.[7] .................................................. E03D 7/14
(52) U.S. Cl. ........................................ 324/303; 324/300
(58) Field of Search ................................ 324/303, 300, 324/309, 307, 318, 319, 322

(56) References Cited

U.S. PATENT DOCUMENTS

| | | | |
|---|---|---|---|
| 4,584,874 A | 4/1986 | Ruhovets | 73/152 |
| 4,712,424 A | 12/1987 | Herron | 73/152 |
| 4,722,220 A | 2/1988 | Herron | 73/152 |
| 4,773,264 A | 9/1988 | Herron | 73/152 |
| 4,810,876 A | 3/1989 | Wraight et al. | 250/256 |
| 4,903,527 A * | 2/1990 | Herron | 73/152 |
| 4,916,616 A * | 4/1990 | Freedman | 364/422 |
| 4,972,082 A | 11/1990 | Loomis et al. | 250/269 |
| 5,051,581 A | 9/1991 | Hertzog et al. | 250/266 |
| 5,235,285 A | 8/1993 | Clark et al. | 324/342 |
| 5,471,057 A | 11/1995 | Herron | 250/269.6 |
| 5,539,225 A | 7/1996 | Loomis et al. | 250/269.4 |
| 5,786,595 A * | 7/1998 | Herron | 250/256 |
| 6,073,079 A * | 6/2000 | Thomas | 702/9 |
| 6,140,816 A * | 10/2000 | Herron | 324/303 |
| 6,255,819 B1 * | 7/2001 | Day et al. | 324/303 |
| 6,337,568 B1 * | 1/2002 | Tutunji et al. | 324/303 |
| 6,362,619 B2 * | 3/2002 | Prammer et al. | 324/303 |
| 6,366,087 B1 * | 4/2002 | Coates et al. | 324/303 |
| 6,571,619 B2 * | 6/2003 | Herron et al. | 73/152.14 |

FOREIGN PATENT DOCUMENTS

| | | | | |
|---|---|---|---|---|
| EP | 0 621 494 A1 * | 10/1994 | | G01V/5/10 |
| WO | WO01/22123 | 3/2001 | | G01V/5/10 |

OTHER PUBLICATIONS

Ahmed, U. et al. "Permeability Estimation: The Various Sources and Their Interrelationship". SPE 19604, (1989), pp. 649–662.

Archie, G. E. , "The Electrical Resistivity Log as an Aid in Determining Some Reservoir Characteristics". AIME, 146, (1942), pp. 54–62.

(List continued on next page.)

*Primary Examiner*—Brij B. Shrivastav
(74) *Attorney, Agent, or Firm*—William B. Batzer; John J. Ryberg (57) ABSTRACT

A method of using nuclear spectroscopy measurements acquired while drilling a subsurface formation including: measuring indicators of a plurality of absolute or relative formation elemental concentrations; processing the measurements to determine a petrophysical parameter associated with the subsurface formation while drilling, and using the petrophysical parameter to determine a drilling parameter. The petrophysical parameter may include, for instance, the permeability of the subsurface formation and the drilling parameter may include, for instance, a change in the orientation of a directional drilling assembly or the point at which to stop drilling. The invention further involves an apparatus adapted to carry out the inventive method.

14 Claims, 5 Drawing Sheets

OTHER PUBLICATIONS

Clavier, C. et al. "The Theoretical and Experimental Bases for the 'Dual Water' Model for the Interpretation of Shaly Sands". SPE 6859, (1977), pp. 1–16.

Clavier, C. et al. "Theoretical and Experimental Bases for the Dual–Water Model for Interpretation of Shaly Sands". SPE J, 24, (1984), pp. 153–167.

Coates, G. R. et al. "The MRIL in Conoco 33–1—an Investigation of a New Magnetic Resonance Imaging Log". SPWLA 32nd Annual Log. Symposium, (1991), Paper DD, pp. 1–23.

Grau, J. A. et al. "Elemental Concentrations from Thermal Neutron Capture Gamma–ray Spectra in Geological Formulations". Nuclear Geophysics (1989), vol. 3, No. 1, pp. 1–9.

Gravestock, D. I., "Behavior of Waxman–Smits Parameter 'B' in High Rw, High Temperature Reservoirs". Log Analyst, 32(5), (1991), pp. 596–602.

Herron, M. M. et al. "A Robust Permeability Estimator for Siliciclastics". SPE 49301 (1998), pp. 1–11.

Herron, M. M. et al. "Log Interpretation Parameters Determined from Chemistry, Mineralogy and Nuclear Forward Modeling". Proceeding of the Int'l Symposium of the Society of Core Analysts 9727 (1997), pp. 1–12.

Herron, M. M. et al. "Quantitative Lithology: Open and Cased Hole Application Derived From Integrated Core Chemistry and Minerology Data Base". Core–Log Integration (1998), No. 136, pp. 81–95.

Herron, S. L. et al. "Application of Nuclear Spectroscopy Logs to the Derivation of Formation Matrix Density". SPWLA 41st Annual Logging Symposium (Jun. 2000), Paper JJ, pp. 1–12.

Herron, S. L. et al., "Quantitative Lithology: An Application for Open and Cased Hole Spectroscopy". SPWLA 37th Annual Logging Symposium (1996), Paper E, pp. 1–14.

Herron, Susan L. et al. "Geochemical Logging of a Middle East Carbonate Reservoir". Journal of Petroleum Technology SPE 21435 (Nov. 1992), pp. 1176–1183.

Horkowitz, J. P. et al. "Complex Reservoir Evaluation in Open and Cased Wells". SPWLA 38th Annual Logging Symposium (1997), Paper W, pp. 1–14.

Johnson, D. L. et al. "New Pore–Size Parameter Characterizing Transport in Porous Media". Phys. Rev. Lett., vol. 57, No. 20 (1986), pp. 2564–2567.

Sen, P. N. et al. "Electrical Conduction in Clay Bearing Sandstones at High and Low Salinities". Journal of Applied Physics, vol. 63, No. 10 (1988), pp. 4832–4840.

Timur, A., "Producible Porosity and Permeability of Sandstones Investigated Through Nuclear Magnetic Resonance Principles". The Log Analyst, vol. 10, No. 1 (1969), pp. 3–11.

Waxman, M. H. et al. "Electrical Conductivities in Oil Bearing Shaly Sands". SPE, 8, (1968), pp. V–145–V–160.

Waxman, M. H. et al. "Electrical Conductivities in Shaly Sands– I. The Relation Between Hydrocarbon Saturation and Resistivity Index" J. Pet. Tech. Trans. AIME 257, (1974),pp. 213–218.

Waxman, M. H. et al. "Electircal Conductivities in Shaly Sands– II. The Temperature Coefficient of Electrical Resistivity". J. Pet. Tech. Trans. AIME 257, (1974), pp. 218–255.

Worthington, P.F., "Evolution of Shaly Sand Concepts in Reservoir Evaluation". The Log Analyst, 26(1), (1985), pp. 23–40.

* cited by examiner

| FIG.3A |
| FIG.3B |
| FIG.3C |

METHOD OF USING NUCLEAR SPECTROSCOPY MEASUREMENTS ACQUIRED WHILE DRILLING

CROSS-REFERENCE TO RELATED APPLICATION

This application is a continuation-in-part of U.S. application Ser. No. 09/975,416, filed Oct. 11, 2001, now U.S. Pat. No. 6,571,619, incorporated herein by reference.

FIELD OF THE INVENTION

This invention relates to the use of measurements acquired while drilling and more particularly to the use of nuclear spectroscopy measurements acquired while drilling.

BACKGROUND

Advances in drilling technologies, including systems capable of drilling extended reach horizontal wells, have increased the need for "real time" petrophysical answers during the drilling process. To optimize well placement/design and/or the drilling process, it is important to have as much knowledge as possible regarding petrophysical parameters associated with the subsurface formation being drilled, such as the porosity, permeability, and hydrocarbon/water saturation of the formation. Measurement-while-drilling nuclear spectroscopy devices have made possible the calculation of such petrophysical parameters during the drilling process.

For this reason, it would be of great benefit to be able to provide a method of using nuclear spectroscopy measurements to determine a petrophysical parameter associated with the subsurface formation being drilled and then to use this petrophysical parameter to determine a drilling parameter during the drilling process.

SUMMARY OF INVENTION

One aspect of the invention involves a method of using nuclear spectroscopy measurements acquired while drilling a subsurface formation that includes measuring indicators of a plurality of absolute or relative formation elemental concentrations; processing the measurements to determine a petrophysical parameter associated with the subsurface formation while drilling, and using the petrophysical parameter to determine a drilling parameter. The petrophysical parameter may include, for instance, the permeability of the subsurface formation and the drilling parameter may include, for instance, a change in the orientation of a directional drilling assembly or the point at which to stop drilling. The invention further involves an apparatus adapted to carry out the inventive method. Further details and features of the invention will become more readily apparent from the detailed description that follows.

BRIEF DESCRIPTION OF FIGURES

The invention will be described in more detail below in conjunction with the following Figures, in which.

DETAILED DESCRIPTION

Figure 1:
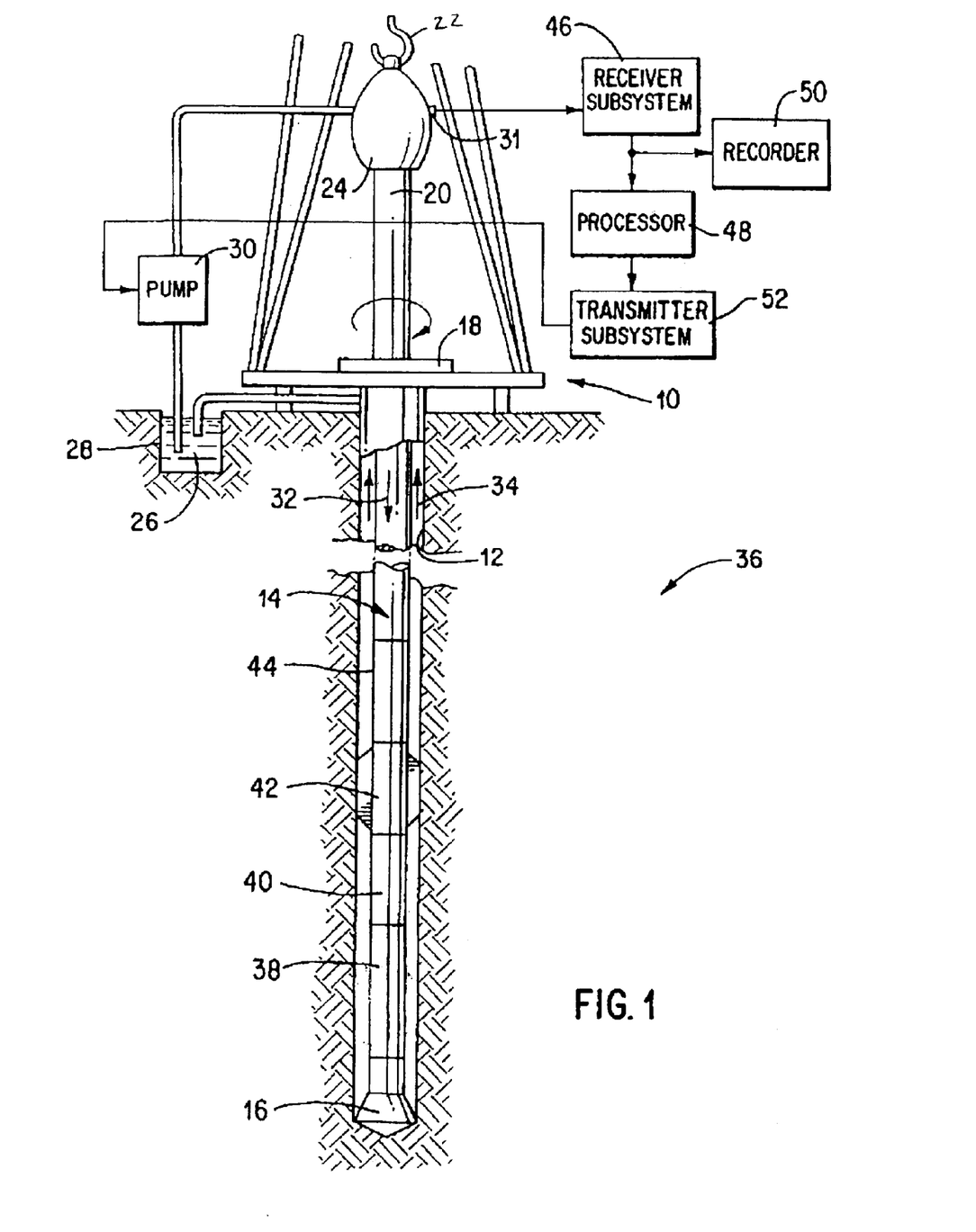
FIG. 1 schematically represents a drilling rig having directional drilling and measurement-while-drilling capabilities that may be used in accordance with certain embodiments of the inventive method.

The present invention involves using nuclear spectroscopy measurements obtained while drilling, obtained for instance using the equipment illustrated in FIG. 1 of the drawings. Nuclear spectroscopy measurements made while drilling, as described herein, include nuclear spectroscopy measurements made while the bit is actually drilling into the subsurface formation, while pausing and/or while tripping.

As shown in FIG. 1, a platform and derrick 10 are positioned over a borehole 12 that is formed in the earth by rotary drilling. A drill string 14 is suspended within the borehole and includes a drill bit 16 at its lower end. The drill string 14 and the drill bit 16 attached thereto are rotated by a rotating table 18 (energized by means not shown) which engages a kelly 20 at the upper end of the drill string. The drill string is suspended from a hook 22 attached to a travelling block (not shown). The kelly is connected to the hook through a rotary swivel 24 which permits rotation of the drill string relative to the hook. Alternatively, the drill string 14 and drill bit 16 may be rotated from the surface by a "top drive" type of drilling rig.

Drilling fluid or mud 26 is contained in a mud pit 28 adjacent to the derrick 10. A pump 30 pumps the drilling fluid into the drill string via a port in the swivel 24 to flow downward (as indicated by the flow arrow 32) through the center of drill string 14. The drilling fluid exits the drill string via ports in the drill bit 16 and then circulates upward in the annulus between the outside of the drill string and the periphery of the borehole, as indicated by the flow arrows 34. The drilling fluid thereby lubricates the bit and carries formation cuttings to the surface of the earth. At the surface, the drilling fluid is returned to the mud pit 28 for recirculation. A directional drilling assembly 38, which may comprise a mud motor having a bent housing or an offset sub, may be employed to allow the drill bit 16 to be steered during the drilling process.

Mounted within the drill string 14, preferably near the drill bit 16, is a bottom hole assembly (indicated generally by the reference numeral 36), which includes subassemblies, for making measurements, processing and storing information and for communicating with the earth's surface. Preferably, the bottom hole assembly is located within several drill collar lengths of the drill bit 16. In the illustrated bottom hole arrangement of FIG. 1, a drill collar section 40 is shown immediately above the directional drilling assembly 38, followed in the upward direction by a stabilizer collar section 42 and another drill collar section 44. This arrangement of drill collars and stabilizer collars is illustrative only, and other arrangements may of course be used. The need for or desirability of the stabilizer collars will depend on drilling conditions. In the embodiment shown in FIG. 1, the components of the downhole measurement subassembly are preferably located in the drill collar section 40 above the directional drilling assembly 38. Such components could, if desired, be located closer to or farther from the drill bit 16, such as, for example, in either the directional drilling assembly 38, the stabilizer collar section 42, or drill collar section 44.

The components of the downhole measurement subassembly include a nuclear spectroscopy device (such as Schlumberger's xPET™ tool) and also, preferably, density, neutron, resistivity, and temperature measurement devices (which could include, for instance, Schlumberger's ADN™, CDN™, RAB™, and/or ARC-5™ tools). While separate spectroscopy, density, neutron, and resistivity tools may be used, other types of tools may be used, such as the integrated-functionality devices.

The bottom hole assembly 36 also includes a telemetry subassembly (not shown) for data and control communication with the earth's surface. Such apparatus may be of any suitable type, e.g., a mud pulse (pressure or acoustic) telemetry system as disclosed in U.S. Pat. No. 5,235,285, which receives output signals from the data measuring sensors and transmits encoded signals representative of such outputs to the surface where the signals are detected, decoded in a receiver subsystem 46 and applied to a processor 48 and/or a recorder 50. The processor 48 may comprise any suitably programmed computer, and the recorder 50 preferably comprises a conventional recorder-plotter for making the usual visual, magnetic, and/or optical data record as a function of borehole depth. A surface transmitter subsystem 52 may also be provided for establishing downward communication with the bottom hole assembly 36, as disclosed, for example, in the aforementioned U.S. Pat. No. 5,235,285, including particularly the directional drilling assembly 38.

The bottom hole assembly 36 preferably also includes conventional acquisition and processing electronics (not shown) comprising a microprocessor system (with associated memory, clock and timing circuitry, and interface circuitry) capable of timing the operation of the downhole sensors, storing data from the sensors, processing the data and storing the results, and coupling any desired portion of the data to the telemetry components for transmission to the surface. Alternatively, the data may be stored downhole and retrieved at the surface upon removal of the drill string. Suitable downhole circuitry for these purposes is described in U.S. Pat. Nos. 4,972,082 and 5,051,581. To facilitate electrical connections and signal transmission between the measurement subassembly, the data acquisition and processing subassembly, and the data telemetry subassembly, these components are preferably located adjacent to each other in the drill string. Where this is not feasible, the data communications system of the aforementioned U.S. Pat. No. 5,235,285, which provides for both local downhole communication over short distances and downhole-to-surface communication, may be utilized. Power for the downhole electronics may be provided by a battery or, as known in the art, by a downhole turbine generator powered by the drilling fluid. A similar system is described in commonly-owned U.S. Pat. No. 5,539,225, incorporated herein by reference.

Figure 2:
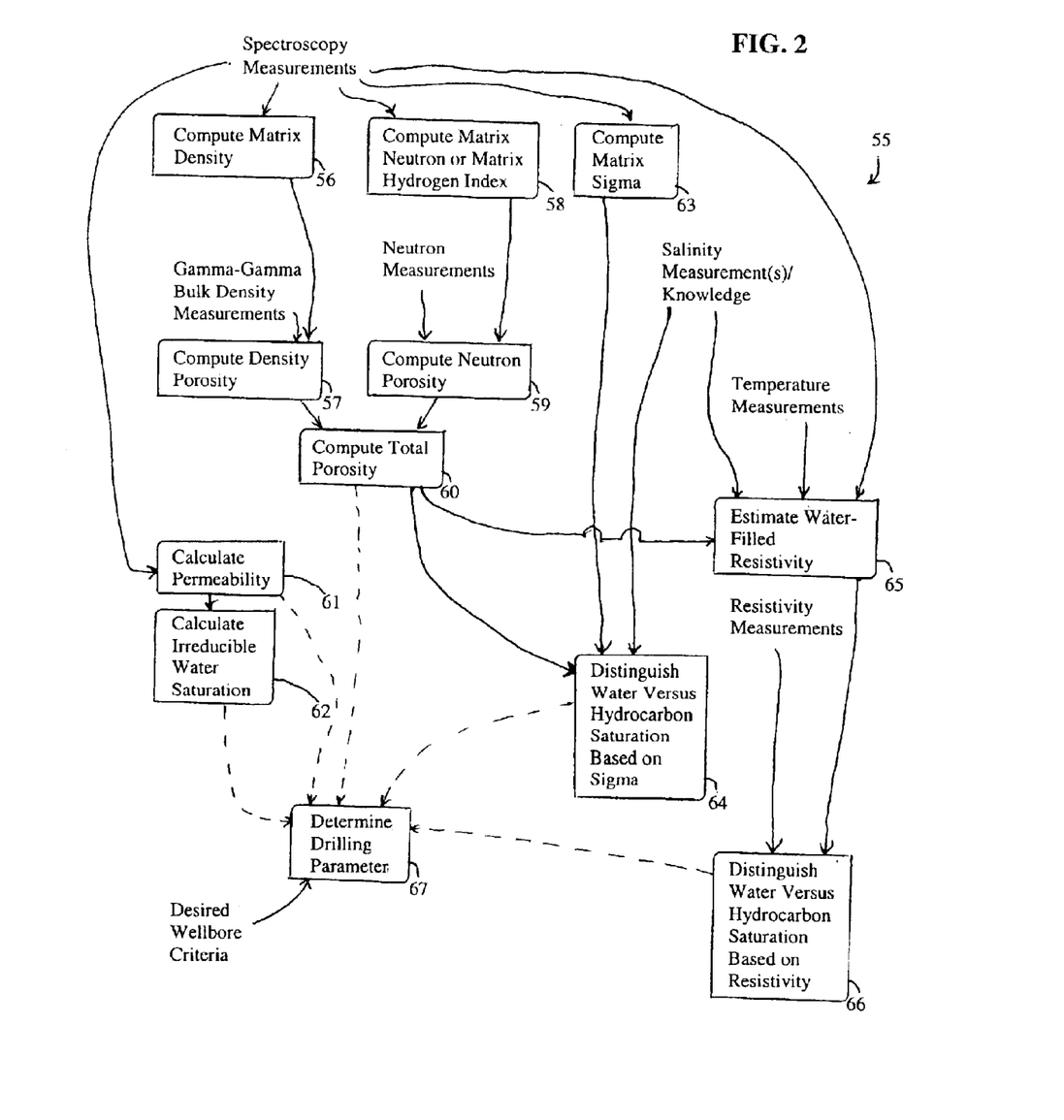
FIG. 2 schematically illustrates data flow and process steps in accordance with certain embodiments of the inventive method.

Operations that may be performed within processor 48 and/or the downhole microprocessor system in connection with certain embodiments of the inventive method are illustrated as Computational Procedures 55 in FIG. 2.

Gamma-gamma bulk density measurements (output from the density device discussed above) may be converted to "density porosity" values. The equation relating bulk density and porosity is $$\emptyset_t = \frac{\rho_{ma} - \rho_b}{\rho_{ma} - \rho_f}, \tag{1}$$

where $\emptyset_t$ is the total porosity, $\rho_b$ is the bulk density, $\rho_{ma}$ is the matrix density, and $\rho_f$ is the fluid density. Since $\rho_b$ is measured and $\rho_f$ is generally well known (it is typically assumed to be the density of the mud filtrate), the largest contributor to uncertainty in the calculation of porosity is $\rho_{ma}$. Typically, this parameter is unknown and a default constant such as 2.65 g cm$^{-3}$, the density of quartz, is typically assumed for field data processing and display.

In a different interpretation paradigm called Direct Computation of Matrix Properties (discussed in more detail in Herron, S. L. and Herron, M. M., 2000, Application of nuclear spectroscopy logs to the derivation of formation matrix density, Trans. SPWLA 41st Ann. Log. Symp., Dallas, Tex., Paper JJ, incorporated by reference), the matrix density can be approximated as a linear combination of the formation elemental fractions of silicon, calcium, iron and sulfur with a standard error of only 0.015 g cm$^{-3}$ according to the relationship:

$$\rho_{ma}=2.620+0.0490DWSI+0.2274DWCA+1.993DWFE+1.193DWSU, \tag{2}$$

where DWSI, DWCA, DWFE, and DWSU are weight fractions of the elements silicon, calcium, iron, and sulfur from spectroscopy measurements. In a pure quartz, substituting a value of 0.47 for DWSI produces a matrix density of 2.65 g cm$^{-3}$; in a pure limestone, substituting a value of 0.4 for DWCA gives a value of 2.71 g cm$^{-3}$. This process permits one to correct for lithology-based changes in matrix density immediately, obviating the need for subsequent mineral modeling. This procedure is depicted in FIG. 2 as Compute Matrix Density Process 56.

The computed matrix density values are combined with the gamma-gamma bulk density measurements in the Compute Density Porosity Process 57 to produce corrected density porosity values.

A similar approach is taken to compute corrected neutron porosity values. In the Compute Matrix Neutron or Matrix Hydrogen Index Process 58, matrix neutron values or matrix hydrogen index values (depending on the type of neutron measurements being made) are computed, again typically from formation elemental weight fractions. The following algorithms have been used to compute appropriate matrix neutron and matrix hydrogen index values:

matrix neutron=0.40816−0.889$DWSI$−1.0136$DWCA$−0.25718$DWFE$+0.67533$DWSU$ matrix hydrogen index=0.30155−0.6229$DWSI$−0.75759$DWCA$−0.47354$DWFE$+0.4521$DWSU$ where DWSI is the silicon concentration in weight percent, expressed as a decimal, DWCA is the calcium concentration, DWFE is the iron concentration, and DWSU is the sulfur concentration from spectroscopy measurements. These computed matrix neutron or matrix hydrogen index values are then similarly combined with the neutron measurements to produce corrected neutron porosity values in the Compute Neutron Porosity Process 59.

The corrected density porosity values and corrected neutron porosity values are then used to produce corrected total porosity values in the Compute Total Porosity Process 60. The preferred method for producing the corrected total porosity values is to select the corrected density porosity values in the absence of neutron/density cross-over and to average the corrected neutron and density porosity values in the presence of neutron/density cross-over. This process is graphically depicted in FIGS. 3A, 3B, and 3C and is discussed in more detail below.

The elemental concentration logs of silicon, calcium, iron, and sulfur can also be used to determine the quantitative lithology of the formation. This interpretation methodology, developed at Schlumberger and called SPECTROLITH™, was developed using a siliciclastic core database of mineralogy and chemistry measured on approximately 400 samples. The SPECTROLITH™ approach uses the elements silicon, calcium, and iron to estimate clay according to equation 3:

$$\text{Clay}=1.91(100-213.9DWSI-249.7DWCA-199DWFE), \tag{3}$$

where DWSI, DWCA, and DWFE are weight fractions of the elements silicon, calcium, and iron. Carbonates concentrations (combining calcite and dolomite) are determined from calcium. Anhydrite or pyrite concentrations are determined using the sulfur log. The remainder of the formation is composed of sand (quartz, feldspar, and mica minerals).

This process, including various alternatives thereto, is described in substantially more detail in the following documents and commonly-assigned U.S. patents, each of which are incorporated by reference:

Grau, J. A., and Schweitzer, J. S., 1989, Elemental Concentrations from Thermal Neutron Capture Gamma-ray Spectra in Geological Formations; Nuclear Geophysics; Vol. 3, No. 1, pp. 1–9;

Herron, S. L. and Herron, M. M., 1996, Quantitative lithology: An application for open and cased hole spectroscopy, Trans. SPWLA 37th Ann. Log. Symp., New Orleans, La., Paper E;

Herron, M. M. and Herron, S. L., 1997, Log interpretation parameters determined from chemistry, mineralogy and nuclear forward modeling, Proc. 1997 Int. Symp. Soc. Core Anal., Calgary, 7–10 September, SCA-9727, 12 p.;

Horkowitz, J. P. and Cannon, D. E., 1997, Complex reservoir evaluation in open and cased wells, Trans. SPWLA 38$^{th}$ Ann. Log. Symp., Dallas, Tex., Paper W;

Herron, M. M. and Herron, S. L. (1998) "Quantitative lithology: open and cased hole applications derived from integrated core chemistry and mineralogy data base," in: Harvey, P. K. & Lovell, M. A. (eds) Core-Log Integration, Geological Society Special Publication No 136, pp. 81–95;

U.S. Pat. No. 4,712,424; entitled "Quantitative determination by elemental logging of subsurface formation properties", issued Dec. 15, 1987 to Michael M. Herron;

U.S. Pat. No. 4,722,220; entitled "Quantitative determination by elemental logging of subsurface formation properties", issued Feb. 2, 1988 to Michael M. Herron;

U.S. Pat. No. 4,810,876; entitled "Logging apparatus and method for determining absolute elemental concentrations of subsurface formations", issued Mar. 7, 1989 to Peter D. Wraight et al.;

U.S. Pat. No. 4,903,527; entitled "Quantitative clay typing and lithological evaluation of subsurface formations", issued Feb. 27, 1990 to Michael M. Herron;

U.S. Pat. No. 5,471,057; entitled "Method and apparatus for determining elemental concentrations for γ-ray spectroscopy tools", issued Nov. 28, 1995 to Susan L. Herron; and U.S. Pat. No. 5,786,595; entitled "Method for estimating lithological fractions using spectroscopy measurements", issued Jul. 28, 1998 to Susan L. Herron and Michael M. Herron.

The formation permeability may be determined using these formation fractional lithology values and the corrected total porosity values (discussed above) in the Calculate Permeability Process 61. This process computes permeability in siliciclastic and related formations based on the Lambda parameter. The Lambda parameter is a measure of the effective diameter of dynamically connected pores and, in the simplest pore geometries, can be approximated from the surface to pore volume ratio. It has been shown that the surface to pore volume data can be computed from mineralogy data or from lithology concentrations. The other required input data are the total porosity, the matrix density, and Archie's cementation exponent, m. In more complex pore systems at lower permeability, some of the pores begin to be ineffective in flow and the initially predicted permeabilities are too high but can be accurately lowered. The k-Lambda initial estimate applied to lithology data is:

$$k_\Lambda = \frac{Z\emptyset^{m^*+2}}{(1-\emptyset)^2(\rho_g)^2(6wcla + 0.22wsan + 2wcar + 0.1wpyr)^2}, \quad (4)$$

where Z is an optimized prefactor, Ø is total porosity, m* is Archie's cementation exponent, $\rho_g$ is the calculated matrix density, and wcla, wsan, wcar, and wpyr are lithology weight fractions of clay, sandstone (quartz, feldspar, and mica), carbonates, and pyrite, respectively. If the initial estimate is less than 100 mD, the final estimate is computed using equation 5:

$$k_\Lambda = 0.037325 k_\Lambda^{1.714}. \quad (5)$$

The process of determining permeability of an earth formation using mineralogy data or from lithology concentrations is discussed in substantially more detail in the following references and commonly-assigned U.S. patents, each of which are incorporated by reference:

Johnson, D. L., Koplik, J. and Schwartz, L. M., 1986, New pore-size parameter characterizing transport in porous media, Phys. Rev. Lett., 57, 2564–2567;

Sen, P. N., Goode, P. A. and Sibbit, A., 1988, Electrical conduction in clay bearing sandstones at high and low salinities, J. Appl. Phys., 63, 4832–4840;

Herron, M. M., Johnson, D. L. and Schwartz, L. M., 1998, A robust permeability estimator for siliciclastics, SPE 49301;

U.S. Pat. No. 4,773,264; entitled "Permeability determinations through the logging of subsurface formation properties", issued Sep. 27, 1988 to Michael M. Herron; and U.S. Pat. No. 6,140,816; entitled "Method of determining the permeability of sedimentary strata", issued Oct. 31, 2000 to Michael M. Herron.

A further process in Computation Procedure 55 is the Calculate Irreducible Water Saturation Process 62. The irreducible water saturation (also referred to as capillary bound water saturation) is the water in the formation that will remain if fluid is withdrawn from the rock matrix. By combining the estimate of permeability derived above with the corrected total porosity, an estimate of irreducible water saturation, BFV, can be obtained using the Coates-Timur-Lambda relationship (6).

$$S_{wirr} = \frac{BFV}{\emptyset} = \frac{100\emptyset^2}{100\emptyset^2 + \sqrt{k_\Lambda}}. \quad (6)$$

Substantially more detailed discussions regarding the Coates-Timur equation can be found in:

Timur, A., 1969, Producible porosity and permeability of sandstones investigated through NMR principles, Log Analyst, 10(1), 3–11;

Ahmed, U., Crary, S. F. and Coates, G. R., 1989, Permeability estimation: the various sources and their interrelationship, SPE 19604; and Coates, G. R., Miller, M., Gillen, M. and Henderson, G., 1991, The MRIL in Conoco 33-1—an investigation of a new magnetic resonance imaging log, Trans. SPWLA 32th Ann. Log. Symp., New Orleans, La., Paper D D; each of which are incorporated by reference.

Two alternative methods may be used to distinguish between water saturation and, hydrocarbon saturation in the subsurface formations. The key to the first method is the ability of nuclear spectroscopy measurements to accurately estimate matrix sigma (the matrix capture cross section) and the difference in capture cross sections of the hydrocarbon fluids and water filling the matrix. One method for estimating matrix sigma is to simply sum the dry weight percentages of each element times the capture cross sections for each of these elements. This type of calculation is described in Horkowitz, J. P. and Cannon, D. E., 1997, Complex reservoir evaluation in open and cased wells, Trans. SPWLA 38$^{th}$ Ann. Log. Symp., Dallas, Tex., Paper W, previously incorporated by reference. If the number of different elements determined using nuclear spectroscopy do not completely capture each of the elements that significantly contribute to the matrix capture cross section, a correlation technique (such as that described in Herron, S. L., et al., November 1992, Geochemical logging of a Middle East carbonate reservoir, Journal of Petroleum Technology, pp. 1176–1183) must be used to estimate the concentration of elements that are not directly measured. This is shown in FIG. 2 as the Compute Matrix Sigma Process 63.

This computed matrix sigma, as well as the total porosity and formation water salinity measurement(s) or knowledge are then input into the Distinguish Water Versus Hydrocarbon Saturation Based on Sigma Process 64. In most cases, the salinity of the formation water is well known. If the value is not known, it is possible to compute the fluid capture cross section first in shales or shaly sands that are likely to be saturated with water and then to use this fluid capture cross section as an estimate of the water fraction capture cross section.

The key to the second method lies in the difference between true formation resistivity, $R_t$, and the resistivity, $R_0$, that would be observed if the formation were filled with brine having the same resistivity as the downhole formation water, $R_w$. There are several resistivity models that could be used to estimate the water-filled resistivity in the Estimate Water-Filled Resistivity Process 65, but only a few are considered "scientifically based". These models generally begin with the observation by Archie that water filled conductivity, $C_0$ ($C_0=1/R_0$) can be considered to be proportional to the total porosity raised to a constant power, m, times the conductivity of the water, $C_w$.

$$C_0 = a\varnothing^m C_w, \quad (7)$$

It was recognized in the 1950's that clays provide an additional conductivity contribution. The first successful general model that included the contribution of clay counterions was the Waxman-Smits equation that models the additional conductivity as equal to the cation exchange capacity per unit pore volume, $Q_v$, times a parameter B which is dependent on temperature and slightly on salinity.

$$C_0 = \varnothing^{m^*}(C_w + BQ_v) \quad (8)$$

This model has been expanded to more completely include the effects of temperature and saturation. The exponent m* has also been modeled as a square root function of cation exchange capacity times matrix density. Applicants have successfully used an average clay value of 0.1 milliequivalents per gram of clay in demonstrating the feasibility of the inventive method and apparatus. The conductivity models that may be used in connection with the invention include the Waxman-Smits-Thomas, Clavier-Coates-Dumanoir, Waxman-Smits-Gravestock, and Sen-Goode-Sibbit conductivity models. The following references, each of which are incorporated by reference, discuss these procedures and variants thereto in detail:

Archie, G. E., 1942, The electrical resistivity log as an aid in determining some reservoir characteristics, Trans. AIME, 146, 54–61;

Waxman, M. H. and Smits, L. J. M., 1968, Electrical conduction in oil bearing shaly sands, SPE J., 8, 107–122;

Waxman, M. H. and Thomas, E. C., 1974, Electrical conductivities in shaly sands—I. The relation between hydrocarbon saturation and resistivity index; II—The temperature coefficient of electrical resistivity, J. Pet. Tech. Trans AIME, 257, 213–255;

Clavier, C., Coates, G. and Dumanoir, J., 1977, The theoretical and experimental bases for the "dual water" model for the interpretation of shaly sands, SPE paper 6859;

Clavier, C., Coates, G. and Dumanoir, J., 1984, Theoretical and experimental bases for the dual-water model for interpretation of shaly sands, SPE J., 24, 153–167;

Worthington, P. F., 1985, Evolution of shaly sand concepts in reservoir evaluation, Log Analyst, 26(1), 23–40;

Sen, P. N., Goode, P. A. and Sibbit, A., 1988, Electrical conduction in clay bearing sandstones at high and low salinities, J. Appl. Phys., 63, 4832–4840;

Sibbit, A., 1988, Electrical conduction in clay bearing sandstones at high and low salinities, J. Appl. Phys., 63, 4832–4840; and Gravestock, D. I., 1991, Behavior of Waxman-Smits parameter 'B' in high Rw, high temperature reservoirs, Log Analyst, 32(5), 596–602.

The estimated water-filled resistivity can then compared to formation resistivity measurements in the Distinguish Water Versus Hydrocarbon Saturation Based on Resistivity Process 66. If $R_t$ is the observed deep resistivity and $R_0$ is the expected resistivity of the formation filled with brine, then the water saturation $S_w$ can be approximated as $$S_w = (R_0/R_t)^n, \quad (9)$$

where n is referred to as the saturation exponent and is typically assigned a value of 2. The hydrocarbon saturation is computed as the difference between the corrected total porosity and the calculated water saturation.

The Determine Drilling Parameter Process 67 then takes as input both the desired wellbore criteria and any one petrophysical parameter or combination of petrophysical parameters that have been calculated above, such as the clay fraction, corrected total porosity, permeability, hydrocarbon saturation, free water saturation, etc., and uses these inputs to determine a drilling parameter. The determined drilling parameter could be, for instance, a change in the orientation of a directional drilling assembly or determining at what point to stop drilling. Other types of drilling parameters that may be determined based on the input petrophysical parameter include drill bit selection, weight on bit, rate of penetration, mud selection, desired borehole trajectory, etc. The inventive method and apparatus can be used, for instance, to influence the drilling direction toward more productive intervals based on changes in porosity, permeability, or hydrocarbon/water saturation, or to stop drilling when anticipated hydrocarbon production matches surface facility design or capability.

Figures 3, 3C:
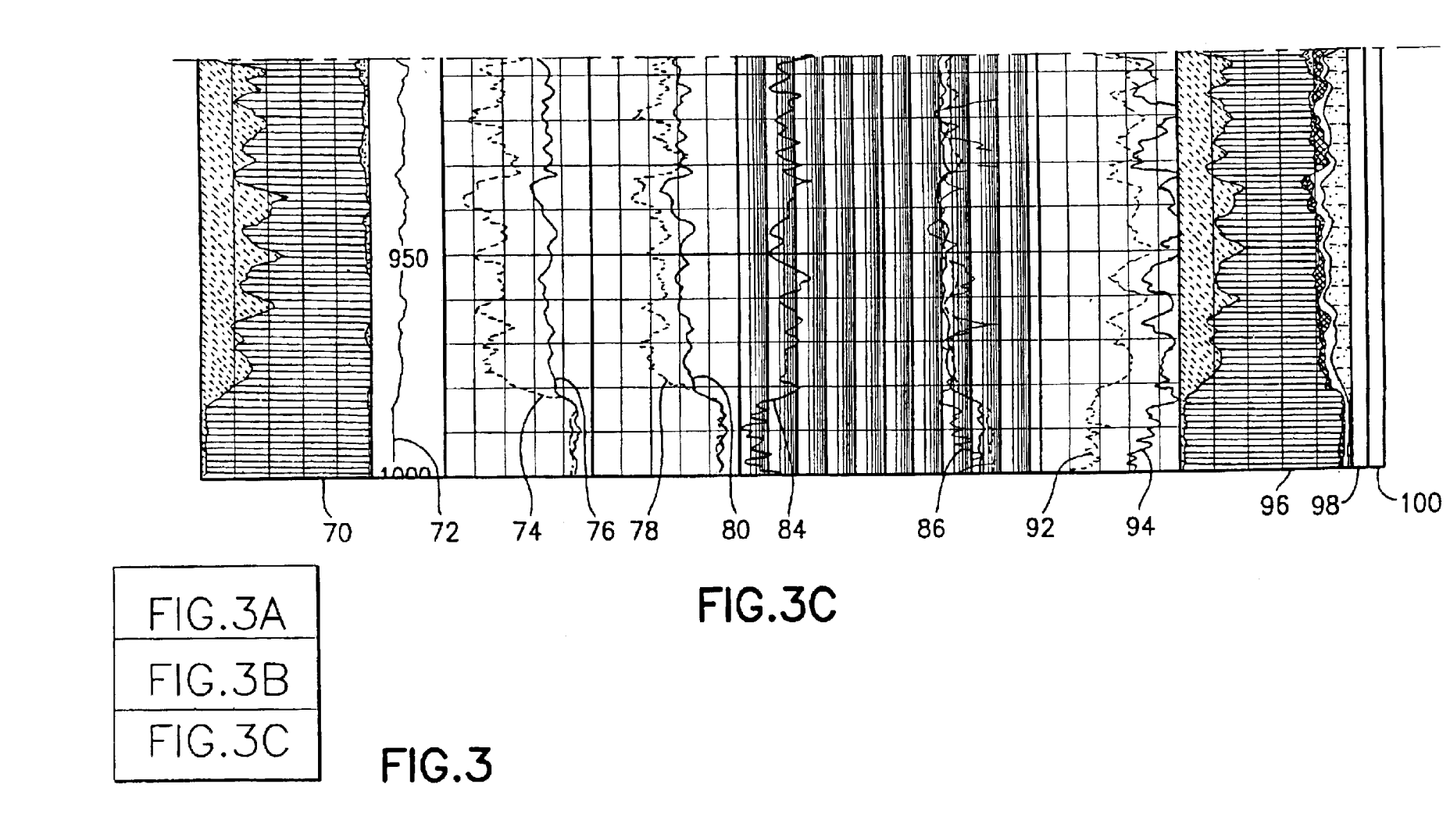
FIGS. 3A, 3B, and 3C are a display showing prophetic output data from the inventive method.
Figure 3A:
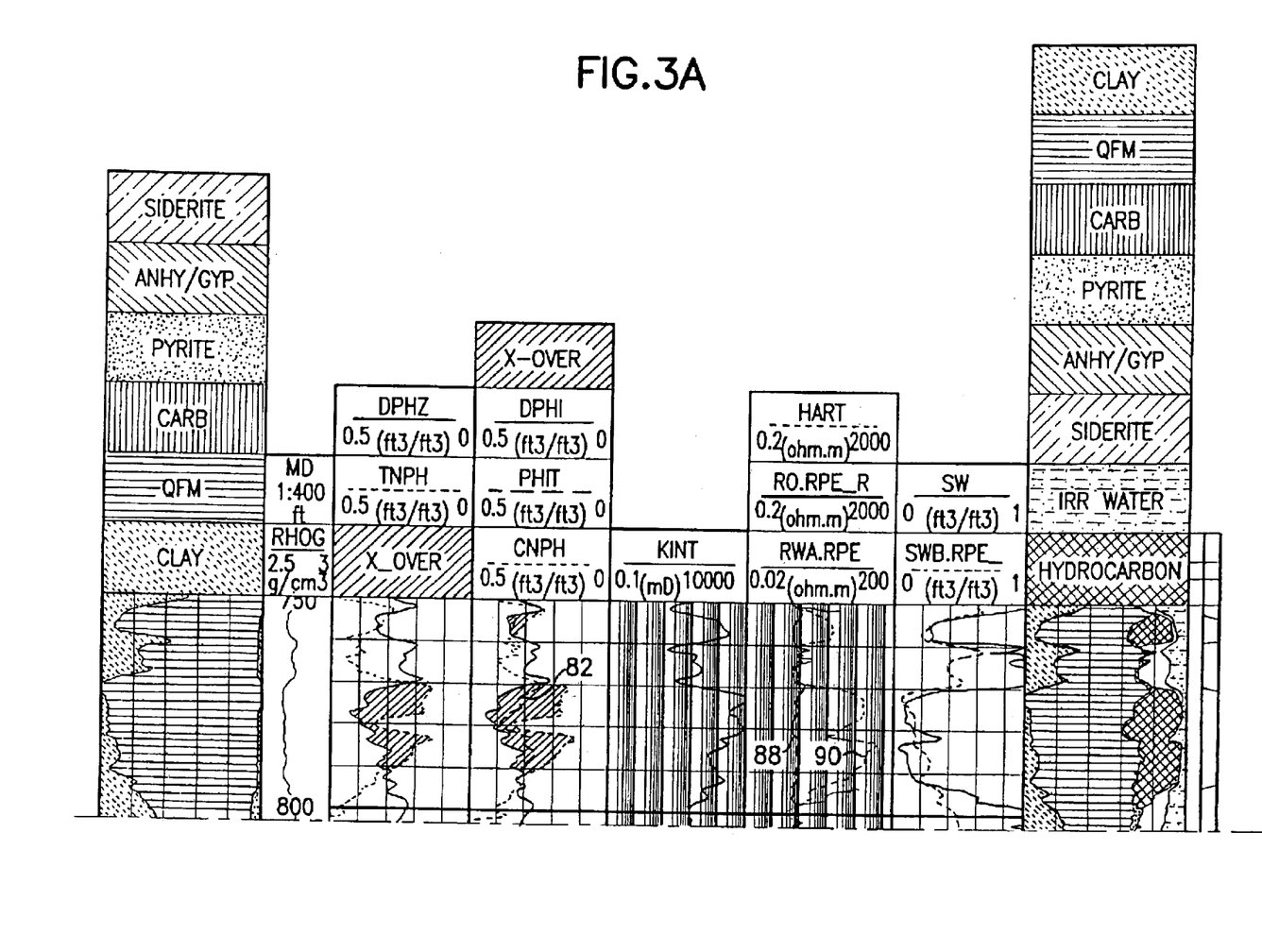
Figure 3B:
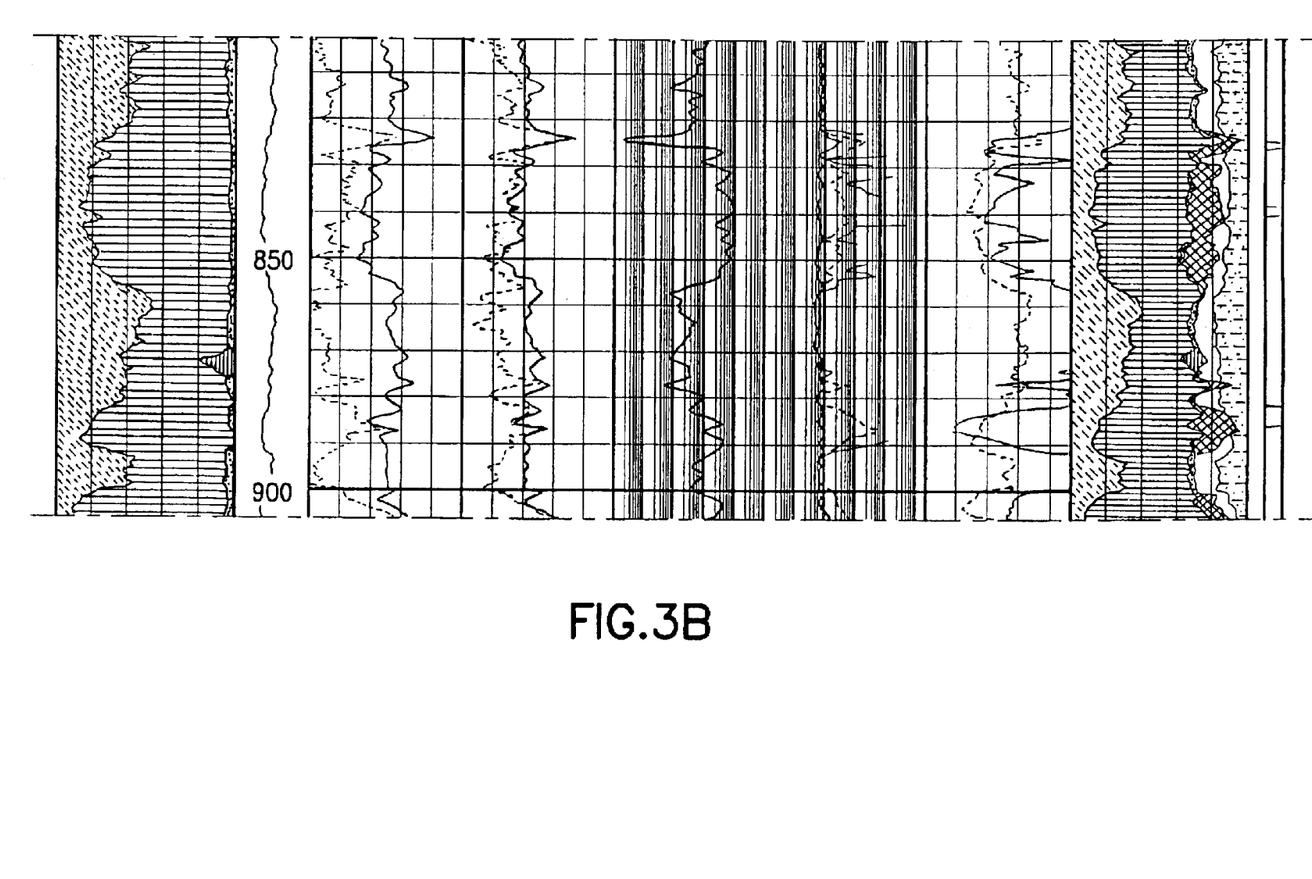

A display showing prophetic output data from the inventive method is shown in FIGS. 3A, 3B, and 3C. While this display has been created using wireline logging data, similar results may be obtained using the inventive method in a measurement-while-drilling environment. The display consists of ten columns. The first column displays quantitative lithology of the formation matrix. The shading for each component mineral is shown at the top of Matrix Lithology Column 70, and the mineral fractions (by weight) are shown with Clay being presented on the left-most side and the other minerals being displayed in inverse order to their shading code at the top (i.e. any Siderite fraction is displayed on the right-most side of the column). The second column displays the Computed Matrix Density 72 (i.e. the output from the Compute Matrix Density Process 56 discussed above) as well as the measured depth (showing that the interval being displayed represents data obtained from 750 to 1000 feet in depth). This column could also be used to display caliper measurements.

The third column displays conventional density porosity values 74 and neutron porosity values 76. Crossover (where the density porosity values are greater than the neutron porosity values, indicating gas, light hydrocarbon, or depletion) is highlighted with cross-hatched shading. The fourth column displays corrected density porosity values 78, corrected neutron porosity values 80, and total porosity values 82 (i.e. the outputs from the Compute Density Porosity Process 57, the Compute Neutron Porosity Process 59, and the Compute Total Porosity Process 60 discussed above). Crossover is again shown as cross-hatched shading. As discussed above, corrected total porosity values are preferably determined by selecting the corrected density porosity values in the absence of neutron/density cross-over and by averaging the corrected neutron and density porosity values in the presence of neutron/density cross-over.

Column five presents the k-Lambda permeability estimate 84 that was produced by the Calculate Permeability Process 61. Column six shows the estimated water-filled resistivity curve 88, $R_0$, and the measured deep resistivity curve 86, $R_t$. Hydrocarbons are identified when $R_t$ exceeds $R_0$. Also shown are the Computed Resistivity Values 90 for formation water that would have produced estimated formation resistivity values matching the measured formation resistivity values. This column is helpful in confirming that the input water salinity estimate was correct or for automatically selecting proper formation water salinity/resistivity/conductivity values.

Column seven shows the estimate of water saturation 94, $S_w$, and the Coates-Timur-Lambda estimate of irreducible water saturation 92. When $S_w$ is less than one, and it overlays the irreducible water saturation curve, one can expect water-free production. Column 8 shows formation volumetric fractions based on material type. In column 8, clay is shown on the left-most side of the column and irreducible water is displayed on the right-most side of the column. Free water is shown in white and hydrocarbon is shown immediately to the left of the free water. Column 98 may be used to display a Problem flag (such as cases where caliper measurements show that the wellbore is substantially larger than intended, i.e. that the measurement equipment may have difficulty in obtaining proper values, or when the calculated values are inconsistent, for instance when the estimated water saturation 94 is less than the irreducible water saturation 92).

Matrix sigma, hydrocarbon/water saturations based on matrix sigma, etc. may also be shown in this display, as described in Herron, S. L., et al., November 1992, Geochemical logging of a Middle East carbonate reservoir, Journal of Petroleum Technology, pp. 1176–1183, previously incorporated by reference.

Column 100 has been used to display a Net Pay flag. As discussed above, net pay can be determined by selecting any known subsurface criteria such as corrected total porosity, permeability, hydrocarbon saturation, free water, etc. The particular interval acceptance criteria used to set net pay flags in FIG. 3 were: water saturation (SW)<0.4; porosity (CNPH)>0.1; and permeability (KINT)>10 mD. Numerous alternative criteria will be obvious to those of ordinary skill in the art.

This method relies on a model that is primarily a siliciclastic or limestone-bearing formation model. The SpectroLith interpretation can provide a good estimate of total clay and a good estimate of total carbonate. Differentiating calcite from dolomite requires additional data such as neutron and density porosity or photoelectric factor. This differentiation is used to get the correct matrix density. One approach is to have separate limestone and dolomite models that can be selected if the major lithology is known a priori. Epithermal hydrogen measurements may also be used in addition to or in place of the thermal neutron measurements described above.

The resistivity calculations require an input of formation salinity or $R_w$. In most cases, this value is well known. If the value is not known, it is possible to make an initial guess, calculate $R_0$ and compare it to $R_t$ in shales or shaly sands that are likely to be saturated with water. The calculation can be made for an entire well in less than a second, so it is possible to use the results to iterate on a best guess for salinity. The process of iterating to seek the best value can easily be automated.

While the invention has been described herein with reference to certain examples and embodiments, it will be evident that various modifications and changes may be made to the embodiments described above without departing from the scope and spirit of the invention as set forth in the claims.

We claim:

1. A method of using nuclear spectroscopy measurements acquired while drilling a subsurface formation comprising:
   measuring indicators of a plurality of absolute or relative formation elemental concentrations;
   processing the measurements to determine a petrophysical parameter associated with the subsurface formation while drilling; and
   using said petrophysical parameter to determine a drilling parameter.

2. A method according to claim 1, wherein said formation elemental concentrations are used to compute formation matrix density.

3. A method according to claim 2, wherein said formation elemental concentrations are used to compute formation matrix neutron and/or formation matrix hydrogen index.

4. A method according to claim 3, wherein formation porosity is determined by selecting corrected density porosity values in the absence of neutron/density cross-over and by averaging corrected neutron and density porosity values in the presence of neutron/density cross-over.

5. A method according to claim 1, wherein said petrophysical parameter comprises one or more of an estimate of formation clay fraction, formation lithology, formation porosity, formation permeability, formation hydrocarbon saturation, and formation free water saturation.

6. A method according to claim 1, wherein said drilling parameter comprises one or more of a change in the orientation of a directional drilling assembly, determining at what point to stop drilling, drill bit selection, weight on bit, rate of penetration, mud selection, and desired borehole trajectory.

7. Apparatus associated with drilling a well in a subsurface formation comprising:
   a downhole nuclear spectroscopy device,
   means for processing measurements obtained by said downhole nuclear spectroscopy device to determine a petrophysical parameter associated with the subsurface formation; and
   means for using said petrophysical parameter to determine a drilling parameter.

8. An apparatus according to claim 7, wherein said petrophysical parameter comprises one or more of an estimate of formation clay fraction, formation lithology, formation porosity, formation permeability, formation hydrocarbon saturation, and formation free water saturation.

9. An apparatus according to claim 7, wherein said drilling parameter comprises one or more of a change in the orientation of a directional drilling assembly, determining at what point to stop drilling, drill bit selection, weight on bit, rate of penetration, mud selection, and desired borehole trajectory.

10. An apparatus according to claim 7, further including one or more of a density device, a neutron device, and a resistivity device.

11. A method of influencing the drilling process comprising:

making a plurality of different measurements on a subsurface formation while drilling; said measurements including indicators of a plurality of absolute or relative formation elemental concentrations;

processing said measurements to determine a plurality of parameters associated with said subsurface formation; and determining drilling parameters based on said determined parameters and desired wellbore criteria.

12. A method according to claim 11, wherein said measurements include one or more of density, neutron, and resistivity measurements.

13. A method according to claim 11, wherein said formation parameters include one or more of formation clay fraction, formation lithology, formation porosity, formation permeability, formation hydrocarbon saturation, and formation free water saturation.

14. A method according to claim 11, wherein said drilling parameters include one or more of a change in the orientation of a directional drilling assembly, determining at what point to stop drilling, drill bit selection, weight on bit, rate of penetration, mud selection, and desired borehole trajectory.

* * * * *